O. C. McCARTY.
Gate.
No. 59,045.
Patented Oct. 23, 1866.
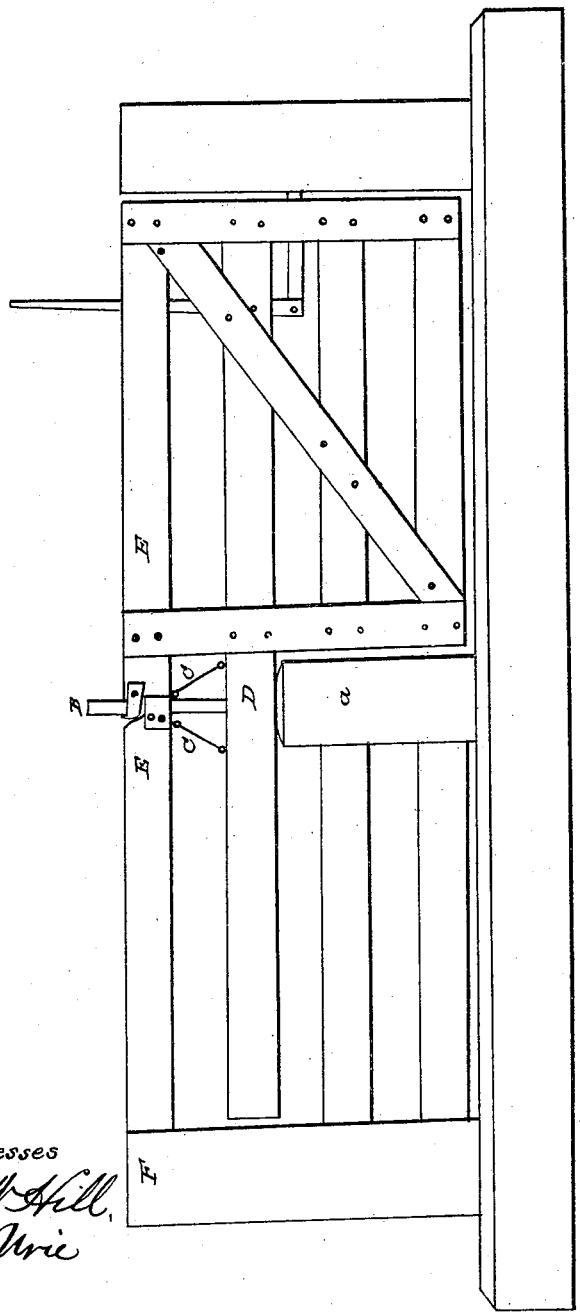
Witnesses
Inventor

UNITED STATES PATENT OFFICE.

OLIVER C. McCARTY, OF HAYSVILLE, OHIO.

IMPROVEMENT IN GATES.

Specification forming part of Letters Patent No. 59,045, dated October 23, 1866.

*To all whom it may concern:*

Be it known that I, OLIVER C. McCARTY, of Haysville, in the county of Ashland, in the State of Ohio, have invented a new and Improved Self-Adjusting Farm-Gate; and do hereby declare that the following is a full and exact description thereof, reference being had to the accompanying drawings, and to the letters of reference marked thereon.

The nature of my invention consists in providing a new means of adjusting the gate so that it will be self-closing and capable of being opened either way, on horseback or otherwise, at the convenience of the farmer.

I construct my self-adjusting gate as follows: The center post, a, is two and a half feet high, and from the top of center of it passes up a rod, B, a few inches above the top of the gate. This rod passes through a bar of the gate, D, and through a loop on the upper bar of the gate and fence, E E, which is securely fastened to the post on the left, F, and on the top bar to the right, E, and from the bar E two chains or three-eighths wires fastened to loops on under side of bar E, and below to two loops on the top of the bar D, which is a revolving bar, capable of following the motion of the gate either way.

When the gate is opened at right angles with its position when closed, the chains or wires C C draw the bar D slightly up, and also the gate; and when the gate is let go it will immediately close itself without further interference by reason of the tendency of the wires to adjust themselves to their original position.

What I claim as my invention, and desire to secure by Letters Patent, is—

The application of the wires or chains C C to the loop E and to the bar D, so as to rotate the gate and cause it to return to its original position when closed, and also the rod B, about which the gate revolves when opened for egress, also the post A, upon which the gate revolves.

OLIVER C. McCARTY.

Witnesses:
   GEO. W. HILL,
   G. W. URIE.